United States Patent
Persicone et al.

(10) Patent No.: US 12,254,782 B1
(45) Date of Patent: Mar. 18, 2025

(54) SYSTEM AND METHOD FOR NON-VERBALLY COMMUNICATING A PERSON'S EMOTIONAL STATE TO OTHERS

(71) Applicants: Patricia A. Persicone, Fresno, CA (US); Mario A. Persicone, Fresno, CA (US)

(72) Inventors: Patricia A. Persicone, Fresno, CA (US); Mario A. Persicone, Fresno, CA (US)

(\*) Notice: Subject to any disclaimer, the term of this patent is extended or adjusted under 35 U.S.C. 154(b) by 246 days.

(21) Appl. No.: 18/106,985

(22) Filed: Feb. 7, 2023

(51) Int. Cl.
*G09B 21/00* (2006.01)
*G09F 13/20* (2006.01)

(52) U.S. Cl.
CPC ............ *G09B 21/00* (2013.01); *G09F 13/20* (2013.01)

(58) Field of Classification Search
CPC .................................. G09B 21/00; G09F 13/20
See application file for complete search history.

(56) References Cited

U.S. PATENT DOCUMENTS

| | | | | |
|---|---|---|---|---|
| 10,311,735 B2* | 6/2019 | Sato | .................. | G02B 27/0101 |
| 10,650,675 B2* | 5/2020 | Saito | ..................... | B60Q 1/547 |
| 11,825,004 B1* | 11/2023 | Halstead | ............... | A63F 13/327 |
| 2018/0309703 A1* | 10/2018 | Ihara | ................. | H04M 1/72436 |
| 2024/0029878 A1* | 1/2024 | Wen | ....................... | G16H 10/65 |

\* cited by examiner

*Primary Examiner* — Arman B Fallahkhair
(74) *Attorney, Agent, or Firm* — Richard A. Ryan (57) ABSTRACT

A system and method for helping a non-communicative person with communicating his or her emotional state to a caretaker. The system has a display unit and a plurality of display plates. The display unit has a base, a plate support that supports one display plate, a light source that directs light to the display plate and a power source that provides electrical power to the light source. In one configuration, the plate support is a slot in an upper surface of the base, with the slot being configured to tightly receive an insert section of the display plate. Each display plate has a unique emotional state indicator representing a possible emotional state. In use, the non-communicative person selects the display plate having an emotional state indicator that represent his or her current emotional state and places the selected display plate on the base so the caretaker can see it.

20 Claims, 6 Drawing Sheets

SYSTEM AND METHOD FOR NON-VERBALLY COMMUNICATING A PERSON'S EMOTIONAL STATE TO OTHERS

BACKGROUND OF THE INVENTION

A. Field of the Invention

The present invention relates generally to apparatuses, systems and methods which are utilized to help a person communicate information to one or more other persons. In particular, the present invention relates to apparatuses, systems and methods that are configured to help a person who has difficulty with communicating how he or she is emotionally feeling be able to communicate his or her emotional state to one or more other persons. Even more particularly, the present invention relates to such apparatuses, systems and methods which have an easy-to-use physical display that allows a person to non-verbally communicate their emotional state to others.

B. Background

Part of the human experience is the ability of people to communicate with other people. In fact, the ability to effectively communicate information from one person to one or more other people is generally considered a necessity for being able to fully function and succeed in modern life, whether the information being communicated is of the type of how to accomplish minor, everyday tasks or how to perform extremely complex and/or live-saving tasks. As well known to most people, communication between people can be verbal communications, such as by speaking, yelling or whispering to others, or non-verbal communications, such as facial expressions, body movements and posture that are "read" or otherwise interpreted by others. While verbal communications between people who speak the same language are typically relatively easy to interpret, it is not uncommon for non-verbal communications to be at least somewhat ambiguous or even difficult for another person to correctly interpret. As such, for very important information, it is often the situation that verbally communicating information to a person is likely to be better than non-verbally communicating that information.

Verbal and/or non-verbal communications between people are also utilized to verbalize or indicate one person's feelings or emotional state to one or more other people. When such communications are verbal, it is often easy for another person to interpret the communicated information and, as may be beneficial and/or necessary, to take action to assist, comfort or move away from the person who is communicating his or her emotional state. Less straightforward, however, is the ability to interpret a person's emotional state from his or her non-verbal communication. For instance, if a person is crying, the usual interpretation is that the person is sad or otherwise upset or not happy. As well known, however, this is not always correct, as a person who is crying may have just received some very good news and is expressing his or her joy or relief by crying about that news. Due to the ease at which non-verbal communications can be misinterpreted, with regard to how a person feels or what his or her emotional state, most people generally understand that verbal communications are a much better approach to effectively communicate his or her feelings or other emotional state than relying only on non-verbal communication skills to communicate emotional state information to another person. As will be readily appreciated by most people, often a person does not choose which way he or she will communicate their feelings or other emotional state to another person.

Unfortunately, when it comes to expressing feelings or other emotions to others, many people have trouble, sometimes significant trouble, communicating information regarding to their emotional state, including their feelings, concerns or other emotional well being status to other people. Difficulties people have with regard to communicating their emotional state to others extend to all types and ranges of emotional feelings, whether or not their emotional state is positive, such as being happy or expressing admiration or love to another, or their emotional state is negative, such as being mad, sad or angry, especially to directly to the person for which those feelings apply. The inability of some people to be able to express their feeling or other emotional state to others extend to communications which are verbally or non-verbally expressed. For instance, some people can be very angry or happy with another person or situation and yet be totally unable and/or unwilling to express that emotion to the other person, particularly while he or she is in their presence. In such situations, the person having such emotions may keep their feelings bottled up inside themselves and not say or indicate anything or they may walk away from the other person so as to be out of their presence and not have to express their emotion state. In a related issue, some people are not able to express an appropriate emotion, such as laughing when an appropriate emotion would be to be sad or express sympathy. Other people are unable to express their emotions at the time when it would be most beneficial, such as telling someone that their actions hurt their feelings or made them made at the time the actions took place. Others are unable to express their emotions in an appropriate manner, such as hitting, intensely yelling or otherwise striking out at a person who inadvertently said something that angered them, hurt their feelings or otherwise was negative to them. Yet others are reticent with regard to such communications.

The ability to express a "correct" emotion to another person at the "correct" time and in the "correct" manner is a skill that is taught to people, usually while they are very young. Unfortunately, for various reasons many people do not, have not and/or are not able to learn such skills. Sometimes the lack of emotional skills is due to a failure of caretaker persons, including parents, teachers and the like, failing to take the time to properly take the time necessary to impart such skills to a young person. In other circumstances, the inability to pass on such skills to another person is due to fact that the caretaker person did not learn or does not have such skills himself or herself. Perhaps more common, however, is the fact that some people have learning and/or emotional limitations, of varying degrees, that prevent him or her from being able to learn, incorporate and/or utilize such emotional skills into their lives and being able to communicate their emotional state to other persons. As generally well known, learning and/or emotional limitations may be a result of a person's genetics and/or may be due to a disease and/or accident that causes the person to be unable to effectively communicate his or her emotional state, whether verbally or non-verbally, to another person whom such communication would be of benefit to the communicator and/or the receiver.

Due to various reasons, including autism, dementia, trauma, severe anxiety and the like, some people are unable or unwilling, even if temporary, to communicate in any meaningful manner to others how they are feeling with regard to their emotional state. Although the circumstances of how and why such people are unable to be able to communicate information regarding their current emotional state to others, including parents, siblings, children, teachers, nurses, mental health professionals and other caretakers, a common result is that the lack of information causes concern for the other person and limits the ability of the other person to understand or, as may be beneficial or necessary, to help or provide comfort to the non-communicative person. The inability of a non-communicative person to provide information to other persons about how they are feeling causes problems whether the person is, for instance happy or sad, and can result in unwanted and unnecessary concern, bother or even annoyance by the person seeking to help the non-communicative person if he or she is happy or a lack of attention if the non-communicative person is sad. As a result, a non-communicative person often has one or more persons, medically trained or not (e.g. psychiatrists, therapists, social workers, parents, teacher and the like), that work with him or her to help them be able to better communicate their emotional state to others. Some of these efforts involve the use of medications or devices, including picture books, dolls and the like. For many non-communicative persons, however, the involvement of professionals or others and the use of such efforts often result in minimal or even no significant improvement in the ability of the non-communicative person to better communicate, whether verbally or non-verbally, their emotional state to others.

Despite the general availability of presently techniques, medications and devices to assist a non-communicative person with being able to communicate or express their feelings and other emotional state conditions, there is a need for an improved system and method for helping a non-communicative person with the ability to communicate his or her emotional state to others. More specifically, what is needed is an improved system and method to help a non-communicative person communicate his or her emotional state to other persons, including parents, siblings, children, teachers, nurses, mental health professionals such as psychiatrists, therapists, social workers and the like (hereinafter, these and "other persons" are collectively referred to as "caretakers", whether the person's objective of seeking emotional state information from a non-communicative person is for care or not). An improved system and method for assisting a non-communicative person with being able to communicate his or her emotional state should be very simple for both the non-communicative person and caretaker to understand and utilize. Any new system or method of improving the ability of a non-communicative person to communicate should be readily adaptable for use by a wide range of non-communicative persons and should be easily adaptable to express a wide range of different types of feelings and other emotional states. Preferably, such a new system and method should be relatively inexpensive to manufacture so it can be widely utilized to assist non-communicative persons with expressing their current emotional state.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The new system and method of the present invention for non-verbally communicating a person's emotional state to others provides the various benefits and solves the problems identified above. That is to say, the present invention is directed to an improved communicating system and method that are configured to help a non-communicative person express or otherwise communicate his or her emotional state to others (i.e., caretakers). The improved system and method of the present invention for assisting a non-communicative person with being able to communicate his or her current emotional state to a caretaker is very simple for both the non-communicative person and caretaker to understand and utilize. The new non-verbally communication system and method of the present invention for improving the ability of a non-communicative person to communicate his or her emotional state to a caretaker or other person can be utilized by a wide range of non-communicative persons, independent of why they are not able to communicate his or her emotional state (e.g., expressive disorder or reticence), and is easily adaptable for use to express a wide range of different types of emotional states. In the preferred configurations, the system and method of the present invention are relatively inexpensive to manufacture so the present invention can be widely utilized to help non-communicative persons.

In one embodiment of the present invention, the new non-verbal communicating system for use by a non-communicative person to communicate his or her emotional state to a caretaker generally comprises a plurality of display plates and a display unit that supports one of the display plates so it can be easily seen by the caretaker. Each one of the display plates has an emotional state indicator on a front surface that is distinct from the emotional state indicator on each of the other display plates. The display unit comprises a base, a plate support that is associated with the base so as to removably support one of the display plates, a light source which is associated with the base and configured to direct light therefrom to the display plate being supported on the base and a power source that is associated with the base and the light source to provide electrical power to the light source. The plate support is cooperatively structured and arranged with each of the display plates so the display plates can be positioned on the base in a manner which will allow the emotional state indicator thereon to be easily seen and understood by the caretaker. In use, a display plate is selected by the non-communicative person such that the emotional state indicator thereon corresponds to his or her emotional state so the display plate can indicate to the caretaker the non-communicative person's emotional state. This will allow the caretaker to take action, as may be needed or desired, to assist the non-communicative person.

The base has an upper surface and the plate support and each of the plurality of display plates are cooperatively configured so a display plate will extend generally upward from the upper surface of the base when the display plate is engaged with the plate support. In a preferred embodiment, the plate support comprises an elongated slot in the upper surface of the base and each of the display plates have an insert section that is sized and configured to be securely, but removably, positioned in the elongated slot and the light source is in the elongated slot so as to direct light upward to the display plate when the light source is on and a display plate is in the elongated slot. Preferably, each of the display plates are made from a transparent material such that the light from the light source will be directed from the lower end of the a display plate to an upper end of the display plate and illuminate the emotional state indicator. Each emotional state indicator has an image and/or a word or words that are selected to represent the possible emotional states of the non-communicative person. In certain preferred configurations, the power source comprises one or more rechargeable batteries in a battery chamber that are recharged with a power cord that connects to the base, the display unit has an on/off switch and/or a remote control for controlling the light source and the light source is configured so the light therefrom can, selectively, change color and/or flash.

In another embodiment of the present invention, the new method for non-verbally communicating an emotional state of a non-communicative person to a caretaker generally comprises the steps of: (a) providing a non-communicative person with a display unit and a plurality of display plates, the display unit having a base, a plate support associated with the base, a light source associated with the base and a power source associated with the base to supply electrical power to the light source, with each of the display plates being cooperatively configured with the plate support so the plate support will securely support one of the display plates in a generally vertical position on an upper surface of the base and each of the display plates having a unique emotional state indicator on a front surface thereof; (b) the non-communicative person being in an emotional state; (c) the non-communicative person selecting one of the display plates that has an emotional state indicator thereon that is in corresponding relation to his or her current emotional state; (d) the non-communicative person positioning the selected display plate in a generally vertical orientation on the base using the plate support; (e) the non-communicative person turning the light source on so as to illuminate the selected display plate; (f) the caretaker seeing the selected display plate and visualizing the emotional state indicator to understand the non-communicative person's emotional state; and (g) the caretaker taking action, which may be simply leaving the non-communicative person alone, in a manner that is consistent with the emotional state indicator on the selected display plate to assist the non-communicative person. In the preferred embodiments, the display unit and the display plates are configured as described above for the system.

Accordingly, the primary object of the present invention is to provide a new communicating system and method for helping a non-communicative person communicate his or her emotional state having the advantages which are set forth above and which overcome the disadvantages and limitations that are associated with presently available apparatuses, systems and method for providing such communicating assistance.

It is also an important object of the present invention to provide a new communicating system and method for helping a non-communicative person be able to non-verbally communicate his or her current emotional state to a caretaker or other person so the other person can understand how the non-communicative person is feeling so, as may be applicable, the other person can help or otherwise help the non-communicative person.

An important aspect of the present invention is that it provides a new communicating system and method for helping a non-communicative person be able to non-verbally communicate his or her current emotional state to others which accomplishes the objectives that are set forth above and elsewhere in the present disclosure.

Another important aspect of the present invention is that it provides a new communicating system and method for helping a non-communicative person, whether it is due to issues such as autism, dementia, trauma, severe anxiety and the like or even being reticent, be able to non-verbally communicate his or her current emotional state to his or her caretaker or other person.

Another important aspect of the present invention is that it provides a new communicating system and method for helping a non-communicative person be able to non-verbally communicate his or her current emotional state to a caretaker so the caretaker can, as may be applicable, take action to assist, comfort or otherwise help the non-communicative person.

Another important aspect of the present invention is that it provides a new communicating system and method for helping a non-communicative person be able to non-verbally communicate his or her current emotional state that, in one of the preferred embodiments, comprises a base, a light source associated with the base, a power source in or attached to the base, a remote controller to control the operation of the light source and a plurality of display plates, with each plate having a separate, individual emotional state indicator on them, that are engaged with the base to position the display plate so a caretaker or others can see the emotional state indicator that is selected by the non-communicative person to help the person indicate his or her current emotional state.

Yet another important aspect of the present invention is that it provides a new communicating system and method for helping a non-communicative person be able to non-verbally communicate his or her current emotional state which is relatively inexpensive to manufacture so that the new system and method may be widely utilized by persons who have difficulty communicating about their emotional state.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction and mode of operation presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations and materials for the components of the system of the present invention, including the base, display plates, light source and power source, which are included in the system and with which the method of the present invention is utilized, persons who are skilled in the relevant art will readily appreciate that the present invention and the components with which the invention can be utilized are not so limited. For instance, the new system and method can comprise different types, materials, sizes and shapes of bases, display plates and the like and the present invention can be utilized with many different types of emotional state indicators on the display plates. In addition, the exemplary embodiments of the present device are shown and described with only those components which are required to disclose the present invention. As such, it is likely that some of the necessary components for manufacturing and using the present invention are not shown in the drawings or necessarily described below, but which are well known to persons who are skilled in the relevant art. As will be readily appreciated by such persons, the various elements of the present invention that are described below may take on any form consistent with forms which are readily realized by one of ordinary skill in the art having knowledge of using a display plate with a base in a manner which positions the display so it can be seen and using light sources to illuminate the display plate to further make the display visible and interesting to view.

Figure 20:
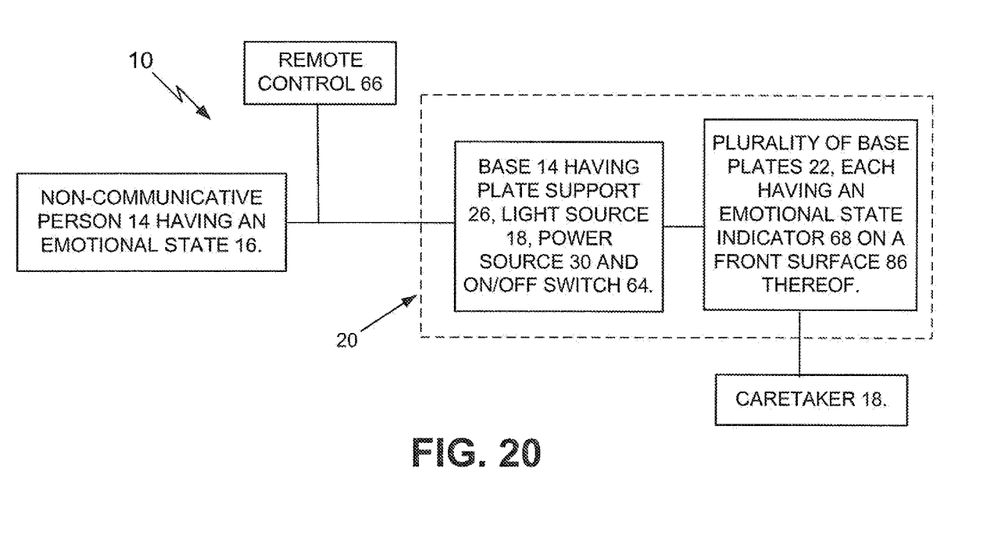
FIG. 20 is a chart summarizing an emotional state communicating system that is configured according to a preferred embodiment of the present invention which utilizes the display unit of FIG. 1.
Figure 21:
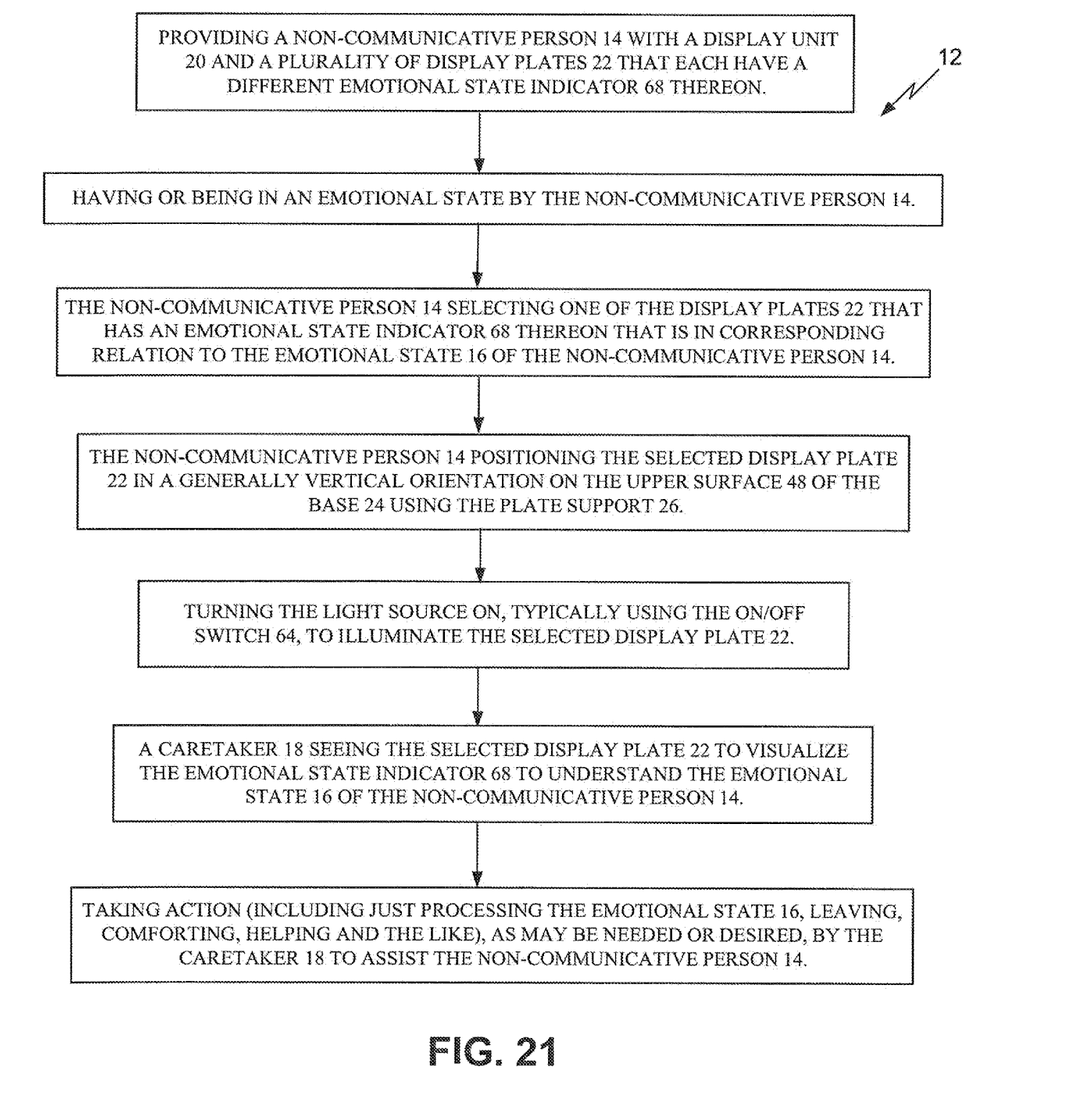
FIG. 21 is a flow chart summarizing a method for non-verbally communicating a person's emotional state to others that is configured according to a preferred embodiment of the present invention which utilizes emotional state communicating system of FIG. 20.

An emotional state communicating system that is configured pursuant to one of the preferred embodiments of the present invention is shown generally as 10 in FIG. 20. A method of utilizing the new communicating system that is configured pursuant to one of the preferred embodiments of the present invention is shown generally as 12 in the flow chart of FIG. 21. As shown in these figures and set forth in more detail below, the new system 10 and method 12 of the present invention are structured and arranged to help a non-communicative person 14, whether he or she is partially or fully non-communicative or temporarily or permanently non-communicative, non-verbally communicate his or her current mental state 16 to a caretaker 18, as best shown in FIGS. 20 and 21. As set forth in the Background, some non-communicative persons 14 are non-communicative due to health or mental issues such as autism, dementia, trauma, severe anxiety and the like or due to being reticent. As a result the issue, the non-communicative person 14 is not able to verbally communicate his or her current emotional state 16 to his or her caretaker 18. This typically results in the non-communicative person 14 being unable, unwilling or correctly utilize body language, hand-signals or the like to non-verbally communicate or express his or her mental state 16 to a caretaker 18 so the caretaker 18 can, as may be applicable, comfort or otherwise assist the non-communicative person 14. As also set forth above, the caretaker 18 may be any person who seeks to understand or otherwise benefit from knowing the mental state 16 of a non-communicative person 14. The present system 10 and method 12 are configured to assist a non-communicative person 14 communicate his or her mental state 16 to a caretaker 18.

In one embodiment, the new emotional state communicating system 10 of the present invention generally comprises display unit 20 and a plurality of display plates 22 that are selectively utilized by a non-communicative person 14 to communicate his or her current mental state 16 to a caretaker 18, as set forth in FIGS. 20-21. The display unit 20 and each of the individual display plates 22 are cooperatively structured and arranged so the display unit 20 will receive, support and display one display plate 22 at a time, with each of the display plates 22 being configured to indicate to a caretaker 18 the current emotional state 16 of the non-communicative person 14 utilizing the system 10 and method 12, as best shown in FIGS. 1-3 and 20-21 of the present invention. Using the system 10 and the method 12 of the present invention, a non-communicative person 14 can display one of the display plates 22 on the display unit 20 to easily and without much effort on his or her part communicate to a caretaker 18 (which can be any person who may check on a non-communicative person 14) his or her mental state 16 so it can be seen by others. Likewise, when one of the display plates 22 are displayed on the display unit 20, the caretaker 18 can, without much effort and without having to ask the non-communicative person 14, easily determine the mental state 16 of the non-communicative person 14 so the caretaker 18 can comfort or otherwise help, even it that means doing nothing and/or leaving the non-communicative person 14 alone, the current mental state 16 of a non-communicative person 14.

Figure 1:
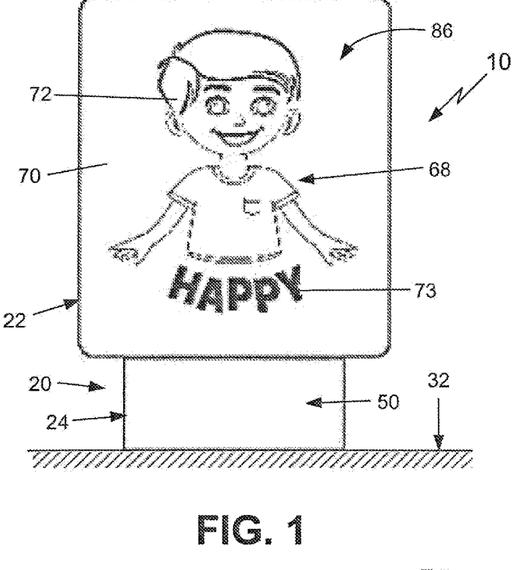
FIG. 1 is a front view of display unit for an emotional state communicating system that is configured according to a first embodiment of the present invention, with the display plate inserted into and supported by the base and the display plate having a "HAPPY" emotional state indicator thereon.
Figure 2:
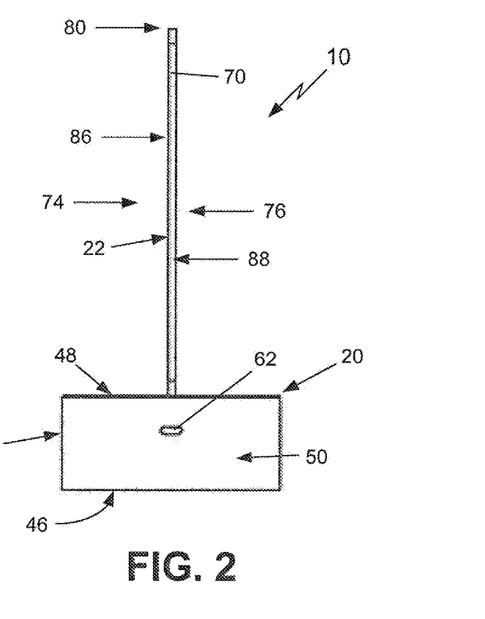
FIG. 2 is a side view of the display unit of FIG. 1.
Figure 3:
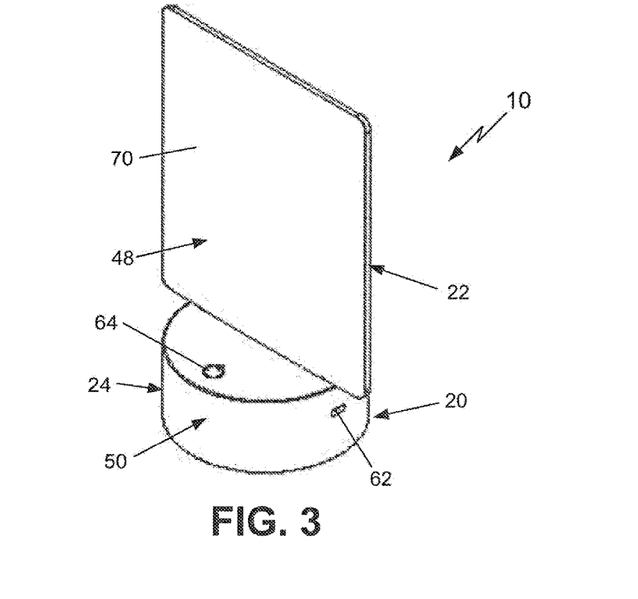
FIG. 3 is a perspective view of the display unit if FIG. 1, shown without the emotional state indicator on the display plate.

In a preferred configuration, the display unit 20 of the present invention generally comprises a base 24, a plate support 26 for receiving and supporting a display plate 22 so the display plate 22 can be easily seen by a caretaker 18, a light source 28 associated with the base 24 to light up the display plate 22, and a power source 30 in or attached to the base 24 to provide electrical power to the light source 28, as shown in FIGS. 1-8. The base 24 is structured and arranged to, in a preferred embodiment, to rest on a support surface 32, such as the top of a table, dresser, counter or the like and support a display plate 22 in a generally upwardly position, as shown in FIGS. 1-3. In the embodiment shown in the figures, the base 24 has the light source 28 facing upwardly and encloses the power source 30. More specifically, the base 24 has a lower end 34, an upper end 36, a front side 38, a back side 40, a first or left side 42 and a second or right side 44, with the lower end 34 defining a lower surface 46 and the upper end 36 defining an upper surface 48 and the sides 38/40/42/44 defining an outer surface 50, as best shown in FIGS. 2-6. In one embodiment, the lower surface 46 is at least generally planar so it can be safely placed on a generally planar support surface 32, as shown in FIG. 1. The plate support 26 and light source 28 are located at or in the upper surface 48, as best shown in FIGS. 3-4 and 7-8. As will be readily appreciated by persons skilled in the art, the base 24 can be made out of a wide range of different types of materials, including plastic, composites, metal, wood and the like, be solid or transparent and be in virtually any size and shape, including round (as shown in the figures), square, rectangle, oval, triangle, star or the like.

For purposes of describing the use and relative location of the various components and use of the system 10 and method 12 of the present invention, the terms "front", "forward", "forwardly" and the like are utilized to refer to or toward the direction part of the display plate 22 and base 24 that is facing toward the reader in FIGS. 1, 9 and 12-19. Likewise, the terms "back", "rearward", "rearwardly" and the like are utilized to refer to or toward the direction generally behind display plate 22 and base 24 in these figures. The terms "up", "upper", "upward", "upwardly", "top" and the like refer to the direction generally at or away from the upper surface 48 of the base 24 and the terms "down", "downward", "downwardly", "lower", "bottom" and the like refer to the direction generally at or away from the lower surface 46 of the base 24 in FIGS. 1-2 and 5.

Figure 4:
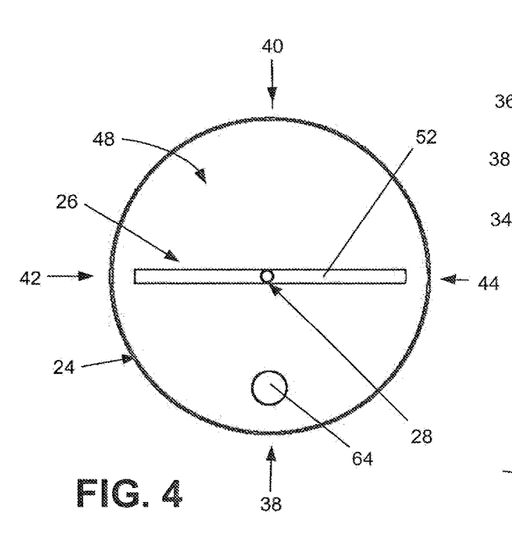
FIG. 4 is a top view of the base of FIG. 1.
Figure 5:
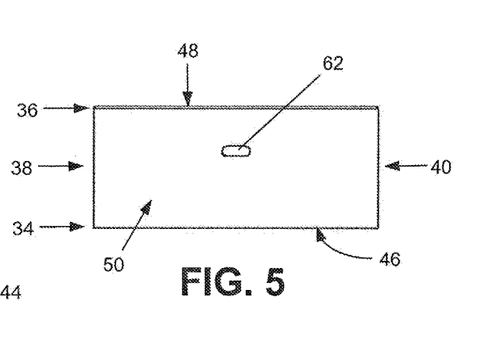
FIG. 5 is a side view of the base of FIG. 4.
Figure 7:
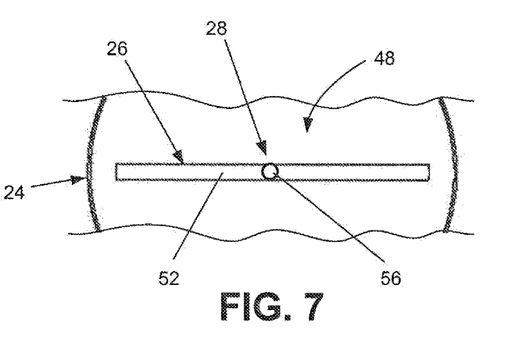
FIG. 7 is an enlarged isolated view of the slot and light source of the base of FIG. 4.
Figure 8:
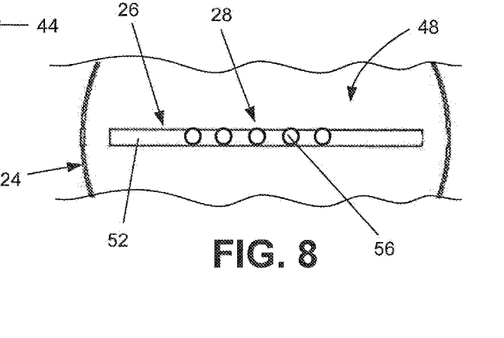
FIG. 8 is an enlarged isolated view of the slot and light source of a base of an alternative configuration of the base of FIG. 4 showing the use of a plurality of lights.

As set forth above, the plate support 26 is structured and arranged to support the display plate 22 in a manner which is easy for the non-communicative person 14 to position a display plate 22 on the base 24 in a manner which allows a caretaker 18 to see the display plate 22 and know the current emotional state 16 of the non-communicative person 14. As will be readily appreciated by persons who are skilled in the relevant art and who are familiar with non-communicative persons 14, it is usually very important that the plate support 26, as well as the operation of the system 12 and method 14 generally, be very easy and simple to use or it is likely the non-communicative person 18 will not use the system 10 and method 12 to communicate his or her emotional state 16. To help accomplish this, the plate support 26 is cooperatively configured with the display plates 22 such that a display plate 22 only needs to be placed in the upper surface 48 of the base 24, as shown in FIGS. 1-3. In a preferred embodiment of the present invention, the plate support 26 comprises an elongated slot 52 in the upper surface 48 that extends across or near the middle of the base 24, as best shown in FIGS. 4 and 7-8. The elongated slot 52 is sized and configured to accept an insert section 54 of the base plates 22 (described in more detail below) in a manner which will support the base plate 22 in a generally upright, vertical position extending upwardly from the upper surface 48 of the base 24 so the display plate 22 easily seen by the caretaker 18, as best shown in FIGS. 1-3.

Preferably, the elongated slot 52 on the base 24 and the insert section 54 of the display plates 22 are cooperatively sized and configured so the base plate 22 only has to be set into the slot 52, thereby requiring little or no real manipulation of components by the non-communicative person 18 to position the base plate 22 in its desired upright position on the base 24. As such the length and thickness of the elongated slot 52 (best shown in FIG. 4) should be selected to be in at least cooperative arrangement with the length and thickness of the insert section 54 of the display plates 22 (best shown in FIG. 9) so the insert section 54 can be placed inside the elongated slot 52. In one embodiment, the thickness of the elongated slot 52 and the thickness of the insert section 54 are selected so the insert section 54 is tightly, or at least sufficiently tightly, placed in the elongated slot 52 so the sidewalls of the slot 52 will engage the sides of the insert section 54 to, on its own, to hold the display plate 22 upright. The configuration and use of a cooperatively configured elongated slot 52 and insert sections 54 of a display plate 22 are well known in the related art. In fact, the use of display plates 22 having an insert section 54 that is placed in an elongated slot 54 of a base 24 are commonly utilized in the prior art (though not in the manner set forth herein for the new system 10 and method 12 of the present invention) and, as such, are well known to those persons who are skilled in the relevant art. Although the likely preferred configuration of the plate support 26 is as set forth above, such persons will also readily appreciate that there are likely other configurations for a plate support 26, such as a "bi-pod" or "tripod" type arrangement, can be utilized with the system 10 and method 12 of the present invention to support a display plate 22 in a generally upright position on the upper surface 48 of the base 14.

The light source 28 is configured to direct light upward to light up a display plate 22 that is positioned in the plate support 26 and standing generally upright above the upper surface 48 of the base 24, as shown in FIGS. 1-3, so that both the non-communicative person 14 and the caretaker 18 can better seen the emotional information, described below, on that reflects the current mental state 16 of the non-communicative person 14. As set forth above, the light source 28 is associated with the upper surface 48 of the base 24 and positioned to face upward toward a display plate 22 in the plate support 26. In a preferred configuration, the light source 28 is electrically connected to the power source 30 and positioned in a light port (not shown) that is located in the elongated slot 52 of the base 24 so as to be directed upward into a display plate 22 that has its insert section 54 disposed in the elongated slot 52. In this configuration, when the light source 28 is powered on or otherwise activated, the light from the light source 28 is directed upward into the display plate 22 upwardly supported in the elongated slot 52 in the upper surface 48 of the base 24. As set forth below, in the preferred embodiments, the display plate 22 is made out of a transparent material such that the light from the light source 28 will pass through insert section 54 thereof to illuminate the display plate 22. Preferably, the light source 28 is cooperatively configured with the elongated slot 52 and the insert section 54 of the display plate 22 such that the light from the light source 28 will only illuminate the display plate 22 and not "overflow" or "spill" out so as to create so much light that it is a nuisance or disturbance (e.g., light up a bedroom and make it hard to sleep or interfere with other activities, such as watching television, in the room where the display unit 20 is located), unless having the overflow light is desired, essentially making the display unit 20 a nightlight.

In a preferred embodiment, the light source 28 is an LED 56 that is sized and configured to fit inside the elongated slot 52, below the lower wall thereof, and direct sufficient light upward to illuminate a display plate 22 that has its insert section 54 inside the elongated slot 52. In a preferred configuration, the LED 56 is selected to be of the type that can direct multiple colors of light upward into the display plate 22 so as to illuminate the display plate 22 with different colors of light. If desired, the light source 28 may be selected so that the light therefrom will flash, either always or as may be chosen by the non-communicative person 14. The configuration and use of multi-color and/or flashing LEDs 56 are generally well known to persons who are skilled in the relevant art. In alternative configurations, the light source 28 can be an incandescent light bulb. However, as will be readily appreciated by persons who are skilled in the art, the LED 56 has substantial benefits with regard to lower power use, longevity and the ability for multi-color and/or flashing operation that it is likely that using a LED 56 as the light source 28 will be significantly preferred. Other types of light sources 28 may also be utilized with the display unit 20.

Figure 6:
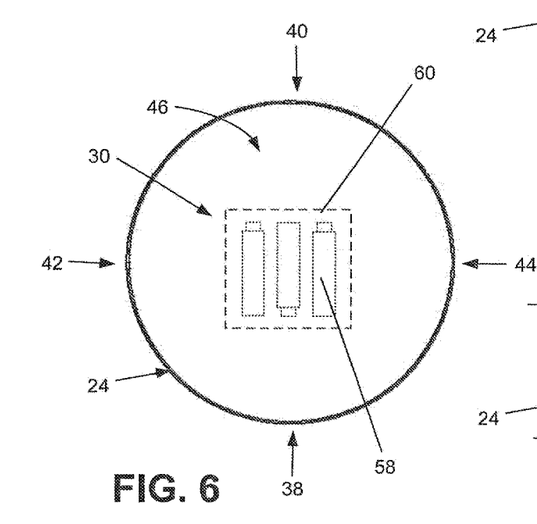
FIG. 6 is a bottom view of the base of FIG. 4.

As set forth above, the display unit 20 of the system 10 and method 12 of the present invention has a power source 30 that is utilized to provide electrical power to the light source 28. As will be readily appreciated by persons who are skilled in the art, a wide variety of different types of power sources 30 can be utilized with the display unit 20. In a preferred embodiment, the power source 30 comprises one or more rechargeable batteries 58, with three being shown, that are positioned in a battery chamber 60 inside the base 24 (as shown in FIG. 6) and the base 24 has a power cord port 62 on one of the sides 38/40/42/44 thereof (shown as being on the first/left side 42 in FIG. 5). In this embodiment, a power cord (not shown) having the appropriate port connector, such as a USB connector for a USB power cord port 62, plugs into the power cord port 62 in the base 24 to recharge the one or more batteries 58 in the battery chamber 60 when such recharging is necessary. In an alternative configuration, the batteries 58 are not rechargeable and must be replaced by accessing the battery chamber 60 through an door or other closure device (not shown) located on one of the outer surfaces 50, typically the lower surface 46, of the base 24. In another alternative configuration, the power source 30 comprises a power cord that is fixedly attached (not shown) to the base 24 and electrically connected to the light source 28, with the power cord connected to an external source of electricity, such as an A/C outlet or the like. As will be readily appreciated by persons who are skilled in the relevant art, a wide range of power sources 30 can be utilized with the display unit 22 of the system 10 and method 12 of the present invention. Any such power source 30 should be selected so as to effectively and safely provide electrical power to the light source 28 and be safe for the non-communicative person 14, caretaker 18 and others to use and, as appropriate, operate.

In one embodiment, the electrical power supplied by the power source 30 is always connected such that the light source 28 is always on and a display plate 22 supported in the plate support 26 is always illuminated. In a preferred embodiment, however, the display unit 20 comprises an on/off switch 64, such as the button shown in FIGS. 3-4, which allows the non-communicative person 14, caretaker 18 and others to turn the light source 28 on and off. In the preferred configuration, the on/off switch 64 also allows the non-communicative person 14, caretaker 18 and others to select the color of the light emitted by the light source 28 to change the color of the display plate 22 illuminated by the light source 28. In other configurations, different types of on/off switches 64 can be utilized (such as a flip-type switch, and/or the on/off switch 64 can be associated with a power cord that connects to the base 24, such as a thumbwheel type of switch or the like on or in-line with the power cord. In yet another embodiment, the on/off and color control operations of the light source 28 can be controlled using a remote control 66, set forth in the system chart of FIG. 20, instead of or in addition to an on/off switch 64 associated with the base 24. In addition, the on/off switch 64 can be located any desired location on the base 24, such as the lower surface 46 or one of the various sides 38/40/42/44 of the base 24 (however, for purposes of ease of access and convenience the upper surface 48 is likely to be preferred).

The display plates 22 are selected by the non-communicative person 14 to convey information to the caretaker 18 that describes the emotional state 16 of the non-communicative person 14 so the caretaker 18 can understand any emotional issues the non-communicative person 14 may have and can, as may be appropriate, necessary or beneficial, the caretaker 18 take action to comfort or assist the non-communicative person 14. To accomplish this, each of the plurality of display plates 22 has a separate, individual emotional state indicator 68 that is associated with the plate body 70 of the display plate 22, as shown in FIGS. 1 and 12-19. Each emotional state indicator 68 comprises an image 72 and/or a word or words 73, examples of which are shown in FIGS. 12-19, that are specially selected to represent a possible or likely emotional state 16 that may be experienced by a non-communicative person 14. In use, the non-communicative person 14 selects a display plate 22 that has an emotional state indicator 68 that reflects or at least closely reflects his or her current emotional state 16, places the insert section 54 of the display plate 22 in the plate support 26 of the base 24 and, as may be needed or desired, uses the on/off switch 64 to activate the light source 28 and illuminate the display plate 22. As set forth above for the preferred configuration, the insert section 54 of the display plate 22 is placed in the elongated slot 52 in the upper surface 48 of the base 24 so as to position the display plate 22 so a caretaker 18 can easily see the emotional state indicator 68 so the caretaker 18 can comfort, help, leave alone or otherwise assist the non-communicative person 14, as may be applicable and/or needed.

Figure 12:
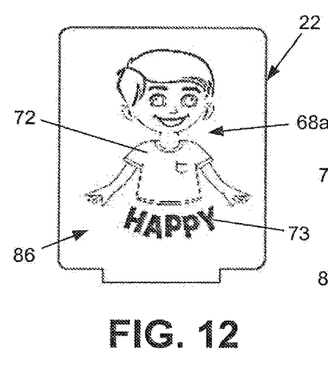
FIG. 12 is a front view of the display plate of the display unit of FIG. 1 shown separate from the base.
Figure 13:
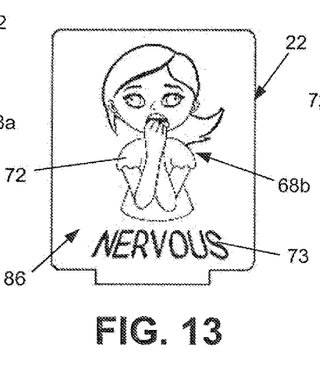
FIG. 13 is a front view of the display plate of the display unit of FIG. 1, with the display plate having an alternative emotional state indicator showing "NERVOUS" thereon.
Figure 14:
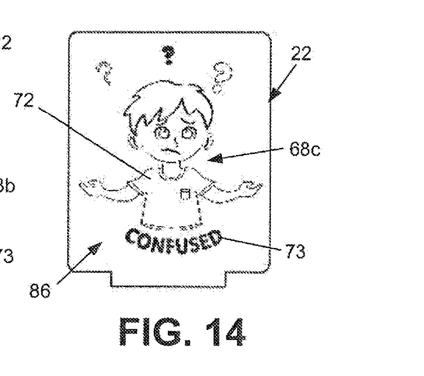
FIG. 14 is a front view of the display plate of the display unit of FIG. 1, with the display plate having an alternative emotional state indicator showing "CONFUSED" thereon.
Figure 15:
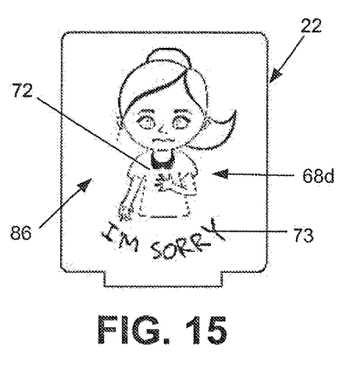
FIG. 15 is a front view of the display plate of the display unit of FIG. 1, with the display plate having an alternative emotional state indicator showing "I'M SORRY" thereon.
Figure 16:
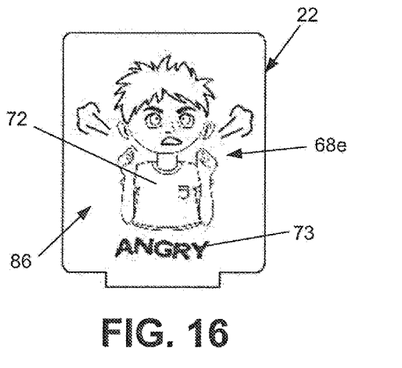
FIG. 16 is a front view of the display plate of the display unit of FIG. 1, with the display plate having an alternative emotional state indicator showing "ANGRY" thereon.
Figures 17, 18:
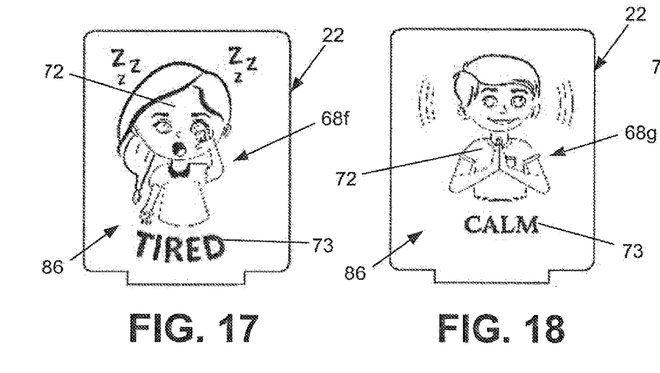
FIG. 17 is a front view of the display plate of the display unit of FIG. 1, with the display plate having an alternative emotional state indicator showing "TIRED" thereon.
FIG. 18 is a front view of the display plate of the display unit of FIG. 1, with the display plate having an alternative emotional state indicator showing "CALM" thereon.
Figure 19:
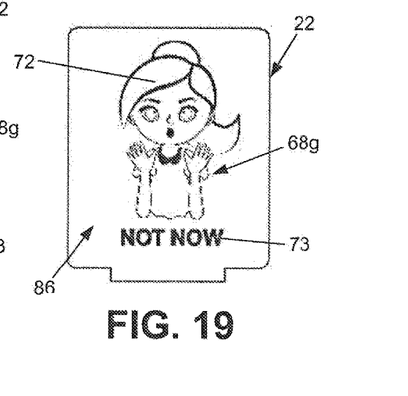
FIG. 19 is a front view of the display plate of the display unit of FIG. 1, with the display plate having an alternative emotional state indicator showing "NOT NOW" thereon.

In the examples shown in the figures, the emotional state indicators 68 on the display plates 22 shown in FIGS. 12-19 include the following emotional states:

(1) HAPPY, 68*a* in FIG. 12;
(2) NERVOUS, 68*b* in FIG. 13;
(3) CONFUSED, 68*c* in FIG. 14;
(4) I'M SORRY, 68*d* in FIG. 15;
(5) ANGRY, 68*e* in FIG. 16;
(6) TIRED, 68*f* in FIG. 17;
(7) CALM, 68*g* in FIG. 18; and
(8) NOT NOW, 68*h* FIG. 19.

As will be readily appreciated by caretakers and other persons who are familiar with possible mental states 16 or are otherwise skilled in the relevant art, the emotional states 16 for the emotional state indicators 68 listed above and shown in FIGS. 12-19 are set forth for exemplary purposes only. As such, the system 10 and method 12 of the present invention may utilize more, less and/or different emotional state indicators 68 for displaying the emotional state 16 of a non-communicative person 14. In addition, the artwork shown as the images 72 for the emotional state indicators 68 are also shown for exemplary purposes only, as the images 72 can be of any gender for any emotional state representation and the images 72 can be other than people, including animals, cartoon or fantasy characters and the like.

Figure 9:
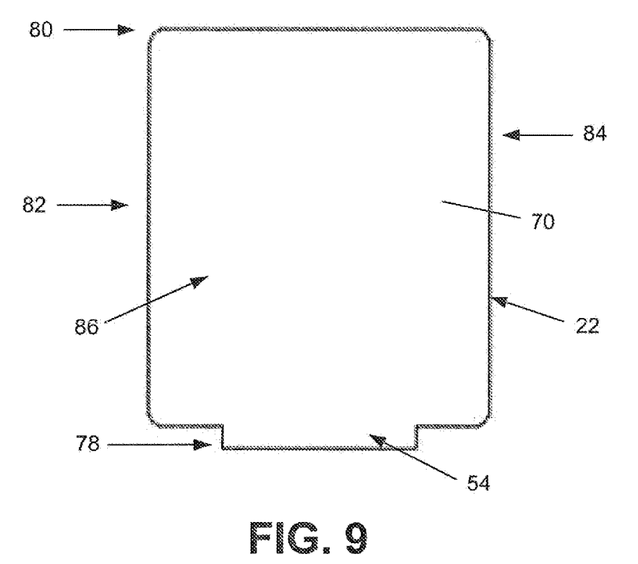
FIG. 9 is a front view of the display plate of the display unit of FIG. 1 shown without the emotional state indicator thereof.
Figure 10:
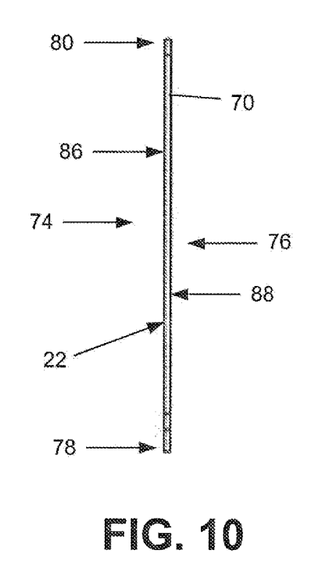
FIG. 10 is a side view of the display plate of FIG. 9.
Figure 11:
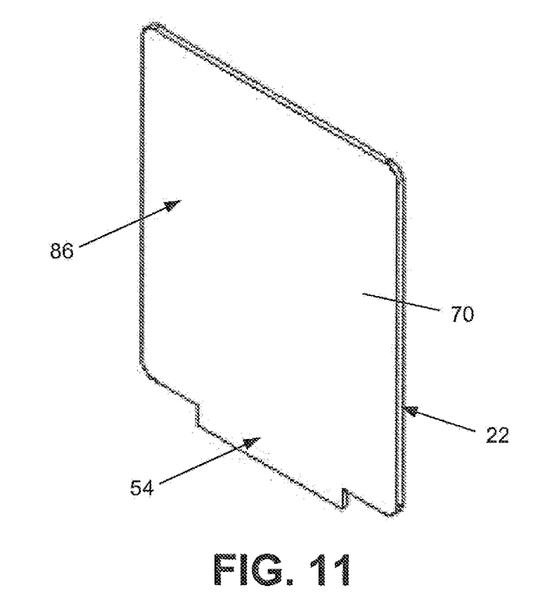
FIG. 11 is a perspective view of the display plate of FIG. 9.

The plate body 70 of each display plate 22 has a front side 74, a back side 76, a lower end 78, an upper end 80, a first/left side 82 and a second/right side 84, as best shown in FIGS. 9-11, that are shown as being in corresponding relation with the same sides of the base 24. As also shown in these figures, the front side 74 defines a front surface 86, the back side 76 defines a back surface 88 and the insert section 54 is located at the lower end 78 of the plate body 70. As set forth above, the insert section 54 is dimensioned to engage the elongated slot 52, preferably tightly fit within, so as to support the display plate 22 in a generally upright position above the upper surface 48 of the base 24, as shown in FIGS. 1-3. In the preferred embodiments, the emotional state indicator 68 is located on the front surface 86 of the display plate 22 above the insert section 54 at the lower end 78 and below the upper end 80 and between the first/left side 82 and the second/right side 84 so the emotional state indicator 68 can be clearly and fully seen by the caretaker 18 when the display plate 22 is placed in plate support 26.

The display plate 22 can be made out of a wide range of materials and in virtually any size and shape (including round, oval, triangle or the like that are not rectangular or square). Preferably, however, the display plates 22 are made in a size which will be easy for the non-communicative person 14 to handle and place in the plate support 26 on the base 24. In addition, the display plates 22 should be made in a manner that there are no sharp edges, such as having rounded corners and the like, to reduce the likelihood of harm to a non-communicative person 14, a caretaker 18 or others. With regard to the materials, however, it is preferred that the material selected for the display plate 22 be of the type that will allow light to pass through the plate body 70 when the light source 28 is on to illuminate the display plate 22 and the emotional state indicator 68 be applied to the front surface 86 so as to also be illuminated by the light passing through the plate body 70. In a preferred configuration, the plate body 70 of the display plate 22 is made out of a clear cast acrylic or the like which will essentially "glow" when the light source 28 is on. In this configuration, the image 72 and word(s) 73 of the emotional state indicator 68 is engraved, etched or the like into the front surface 86 of the acrylic plate body 70 of the display plate 22. In other embodiments, the emotional state indicator 68 can be a sticker or other item that is stuck onto or otherwise applied to the front surface 68 of the display plate 22 or the emotional state indicator can be integrally formed with a molded (or the like) display plate 22. A variety of methods of applying images 72 and/or words 73 to the surface of an object, such as the front surface 86 of an acrylic plate body 70, are generally well known to persons who are skilled in the relevant arts and may be able to be utilized with the display plates 22 of the system 10 and method 12 of the present invention.

As will be readily appreciated by persons who are skilled in the relevant art, the base 24 for the display unit 20 is likely to be available for purchase as a prior art complete unit, therefore not requiring any separate manufacturing of this component, as such bases are commonly utilized for supporting and displaying prior art display plates. The use of prior art display plates that have designs and/or words etched or engraved into a front surface with a base having a light are also commonly utilized. Such prior art design etchings or engravings tend to be general design elements and the words tend to be inspirational or in memory of an event, person, accomplishment or the like. The use of emotional state indicators 68 that are tied to the emotional state 16 of a non-communicative person 14 and used to indicate his or her current emotional state 16 to a caretaker 18, such as in the system 10 and method 12 of the present invention, is not known. The present invention allows a caretaker 18 or others to be aware of the current emotional state 16 of a non-communicative person 14 to allow them to non-verbally communicate his or her emotional state 16 in a manner which will help promote a safe and free discussion when the non-communicative person 14 is ready to verbalize his or her feelings to the caretaker 18. Because the system 10 is mobile, it can be used anywhere that will benefit the non-communicative person 14.

With regard to the method 12 of the present invention, the steps comprise: (1) providing a non-communicative person 14 with a display unit 20 and a plurality of display plates 22 that each have a different emotional state indicator 68 thereon, as described above; (2) having or being in an emotional state by the non-communicative person 14; (3) the non-communicative person 14 selecting one of the display plates 22 that has an emotional state indicator 68 thereon that is in corresponding relation to the emotional state 16 of the non-communicative person 14; (4) the non-communicative person 14 positioning the selected display plate 22 in a generally vertical orientation on the upper surface 48 of the base 24 using the plate support 26; (5) turning the light source on, typically using the on/off switch 64, to illuminate the selected display plate 22; (6) a caretaker 18 seeing the selected display plate 22 to visualize the emotional state indicator 68 to understand the emotional state 16 of the non-communicative person 14; and (7) taking action (including just processing the emotional state 16, leaving, comforting, helping and the like), as may be needed or desired, by the caretaker 18 to assist the non-communicative person 14. In certain uses of the present invention, the method 12 may include selecting a color and/or flashing for the illumination of the display plate 22 and/or using a remote control 66 to turn the light source 28 on or off and to select the desired illumination color. The above method 12 may be repeated, usually with a different display plate 22 having a different emotional state indicator thereon, throughout a day or on different days.

As set forth above, the various components of the new system 10 and method 12 are subject to a number of possible modifications that will still fall within the scope of the present invention. In particular, the size and shape of the display plate 22, base 24 and other components can be different than described above and shown in the figures. Likewise, the system 10 and method 12 can be utilized with a wide variety of different emotional state indicators 68 and images 72 and word(s) 73 to represent emotional states 16. Any such alternative configurations and/or arrangements of the components will be generally well known to persons who are skilled in the relevant art, including non-communicative persons 14, caretakers 18 and others who may use or manufacture the display unit 20 and/or display plates 22. In addition, the various components of the new system 10 and method 12 can be made out a wide variety of different materials. In the preferred embodiments, the system 10 and method 12 are relatively easy to install and use and are likely to be relatively inexpensive to manufacture, thereby making the new system 10 and method 12 widely available for purchase and use.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A non-verbal communicating system for communicating an emotional mental state of a non-communicative person to a caretaker, said system comprising:
   a plurality of display plates, each one of said display plates having a emotional state indicator thereon that is distinct from said emotional state indicator on each other of said plurality of display plates; and
   a display unit having a base, a plate support associated with said base so as to removably support one of said plurality of display plates, a light source associated with said base and configured to direct light therefrom to said one of said plurality of display plates and a power source associated with said base and said light source so as to provide electrical power to said light source, said plate support cooperatively structured and arranged with each of said plurality of display plates so said one of said plurality of display plates can be positioned on said base so as to be seen and understood by the caretaker,
   wherein said one of said plurality of display plates is selected by the non-communicative person so as to correspond to the emotional state of the non-communicative person to indicate to the caretaker the non-communicative person's emotional state so the caretaker may take action in response to said emotional state indicator.

2. The system of claim 1, wherein said base has an upper surface and said plate support and each of said plurality of display plates are cooperatively configured so said one of said plurality of display plates will extend generally upward from said upper surface of said base when said one of said plurality of display plates is engaged with said plate support.

3. The system of claim 2, wherein said plate support comprises an elongated slot in said upper surface of said base and each of said plurality of display plates are structured and arranged to be securely placed in said elongated slot.

4. The system of claim 3, wherein said light source is positioned in said elongated slot so as to direct light therefrom upward to said one of said plurality of display plates when said light source is on and said one of said plurality of display plates is in said elongated slot.

5. The system of claim 4, wherein each of said plurality of display plates are made from a transparent material such that the light from said light source will be directed from said lower end of said one of said display plates to an upper end of said one of said display plates.

6. The system of claim 3, wherein each of said plurality of display plates has an insert section at a lower end thereof that is sized and configured to be removably received in said elongated slot.

7. The system of claim 1, wherein each of said emotional state indicators on each of said plurality of display plates are positioned on a front surface thereof.

8. The system of claim 1, wherein each of said emotional state indicators has at least one of an image and a word that are selected to represent the emotional state of the non-communicative person.

9. The system of claim 1, wherein said power source comprises one or more batteries in a battery chamber.

10. The system of claim 1, wherein said display unit further comprises at least one of an on/off switch and a remote control.

11. The system of claim 1, wherein said light source is configured to selectively change color and/or flash the light therefrom.

12. A non-verbal communicating system for communicating an emotional mental state of a non-communicative person to a caretaker, said system comprising:
   a plurality of display plates, each one of said display plates having an emotional state indicator on a front surface thereof that is distinct from said emotional state indicator on each other of said plurality of display plates, each of said emotional state indicators selected to represent one of a plurality of the emotional states of the non-communicative person, each of said plurality of display plates having an insert section at a bottom end thereof, each of said emotional state indicators having at least one of an image and a word that are selected to represent the emotional state of the non-communicative person; and a display unit having a base with an upper surface, a plate support associated with said upper surface of said base so as to removably support one of said plurality of display plates in a generally vertical position above said upper surface of said base, a light source associated with said plate support so as to direct light therefrom to said one of said plurality of display plates and a power source associated with said base and said light source to provide electrical power to said light source, said plate support sized and configured and cooperatively structured and arranged with each of said plurality of display plates so said one of said plurality of display plates can be securely positioned on said base so as to be seen and understood by the caretaker, wherein said one of said plurality of display plates is selected by the non-communicative person so as to correspond to the emotional state of the non-communicative person to indicate to the caretaker the non-communicative person's emotional state so the caretaker may take action in response to said emotional state indicator.

13. The system of claim 12, wherein said plate support comprises an elongated slot in said upper surface of said base and said insert section of each of said plurality of display plates is sized and configured to be removably and securely placed in said elongated slot so as to hold said one of said plurality of display plates in the generally vertical position above said upper surface of said base.

14. The system of claim 13, wherein said light source is positioned in said elongated slot so as to direct light therefrom upward to said one of said plurality of display plates and each of said plurality of display plates are made from a transparent material such that the light from said light source will be directed from said lower end of said one of said display plates to an upper end of said one of said display plates when said light source is on and said one of said plurality of display plates is in said elongated slot.

15. The system of claim 12, wherein said power source comprises one or more batteries in a battery chamber.

16. The system of claim 12, wherein said display unit further comprises at least one of an on/off switch and a remote control.

17. The system of claim 12, wherein said light source is configured to selectively change color and/or flash the light therefrom.

18. A method for non-verbal communicating an emotional mental state of a non-communicative person to a caretaker, said method comprising the steps of:
  (a) providing a non-communicative person with a display unit and a plurality of display plates, said display unit having a base, a plate support associated with said base, a light source associated with said base and a power source associated with said base to supply electrical power to said light source, each of said plurality of said display plates being cooperatively configured with said plate support so said plate support will securely support one of said plurality of display plates in a generally vertical position on an upper surface of said base, each of said plurality of display plates having a unique emotional state indicator on a front surface thereof;
  (b) being in the emotional state by the non-communicative person;
  (c) the non-communicative person selecting one of said plurality of display plates that has said emotional state indicator thereon that is in corresponding relation to the emotional state of the non-communicative person;
  (d) the non-communicative person positioning said one of said plurality of display plates in a generally vertical orientation on said base using said plate support;
  (e) the non-communicative person turning said light source on to illuminate said one of said plurality of display plates;
  (f) the caretaker seeing said one of said plurality of display plates and visualizing said emotional state indicator to understand the emotional state of the non-communicative person; and
  (g) taking action by the caretaker in a manner consistent with said emotional state indicator on said one of said plurality of display plates supported by said to assist the non-communicative person.

19. The method of claim 18, wherein said plate support comprises an elongated slot in said upper surface of said base and each of said plurality of display plates having an insert section, said insert section of each of said plurality of display plates being sized and configured to be removably and securely placed in said elongated slot so as to hold said one of said plurality of display plates in the generally vertical position above said upper surface of said base.

20. The system of claim 19, wherein said light source is positioned in said elongated slot so as to direct light therefrom upward to said one of said plurality of display plates and each of said plurality of display plates being made from a transparent material such that the light from said light source will be directed from said lower end of said one of said display plates to an upper end of said one of said display plates when said light source is on and said one of said plurality of display plates is in said elongated slot.

* * * * *